United States Patent [19]
Abrams

[11] Patent Number: 6,151,608
[45] Date of Patent: Nov. 21, 2000

[54] METHOD AND SYSTEM FOR MIGRATING DATA

[75] Inventor: Helene G. Abrams, Ann Arbor, Mich.

[73] Assignee: Crystallize, Inc., Ann Arbor, Mich.

[21] Appl. No.: 09/056,360

[22] Filed: Apr. 7, 1998

[51] Int. Cl.$^7$ .................................................. G06F 17/30
[52] U.S. Cl. ........................... 707/204; 707/200; 707/100
[58] Field of Search .................................... 707/204, 200, 707/100, 202, 4, 10, 205, 101

[56] References Cited

U.S. PATENT DOCUMENTS

| | | |
|---|---|---|
| 5,278,978 | 1/1994 | Demers et al. . |
| 5,379,419 | 1/1995 | Heffernan et al. . |
| 5,416,917 | 5/1995 | Adair et al. . |
| 5,566,332 | 10/1996 | Adair et al. . |
| 5,596,746 | 1/1997 | Shen et al. . |
| 5,642,505 | 6/1997 | Fushimi ................................. 707/204 |
| 5,708,828 | 1/1998 | Coleman ............................... 707/526 |
| 5,745,703 | 4/1998 | Cejtin et al. ........................... 709/238 |
| 5,966,704 | 10/1999 | Furegati et al. ............................. 707/3 |
| 5,970,490 | 10/1999 | Morgenstern ............................ 707/10 |

*Primary Examiner*—John Breene
*Assistant Examiner*—Greta L. Robinson
*Attorney, Agent, or Firm*—Brooks & Kushman P.C.

[57] ABSTRACT

Method and system of the invention migrate data from one or more ASCII files and/or from one or more relational databases to one or more relational database tables without the need to write code. In doing so, the invention allows the user to define mapping templates and conditionals to assist in translating and transforming data values. The invention also enforces referential integrity, data dependencies, order of operations, and uniqueness constraints using a predefined set of migration rules templates that are based on the principles of relational design. The invention uses these mapping and migration rules templates to intelligently generate instructions for updating or populating relational database destination tables. The instructions control the data transfer, data translation, data transformation, data validation, foreign key insertion, and the addition of required codes and flags in the destination tables. A migration engine of the system includes a data map architect and an update processor which spawns the templates and migrates the data dynamically, utilizing the data definitions for the destination tables. In addition to supporting conversion efforts, the invention provides support for performing consolidation, restoration from an archive, migration to new instances, upgrading to a new release, adding bolt-ons and enhancements, and changing business requirements. The audit trail in the invention is complete enough that the entire migration process can be reversed without compromising the integrity of either the source or the destination application.

66 Claims, 4 Drawing Sheets

METHOD AND SYSTEM FOR MIGRATING DATA

TECHNICAL FIELD

This invention relates to methods and systems for migrating data and, in particular, to automated methods and systems for migrating data without having to write code.

BACKGROUND ART

The prior art limits its application to a single function (either data conversion or, to a limited extent, data migration among similar databases). There is no prior art defined that is generic enough to cover multiple applications and yet specific enough to allow for tasks such as consolidation, restoration of archived data, and changing configurations. The majority of the prior work only deals with the conversion of data.

There are generally four methods for converting data. The first method, and most traditional approach, begins by extracting data from an original system (source) to an ASCII file. The second step in the approach is to create a script (usually written in SQL) and use a program (such as SQL*Loader™) to populate an Oracle table (destination). The destination table may be either a table or an application programmatic interface which is effectively a standard intermediate table provided by Oracle which performs an update routine to load data into the final application tables. FIG. 1 illustrates the traditional conversion process. The SQL code is used to map the data into the appropriate field in the destination database and to translate the data from the source format to the destination format. In addition, a programmer might add required fields, enforce any data dependencies (e.g. if the value in field 1 is A, then the value in field 2 must be B) and validate the data (e.g. if a unit of measure for an item is dozen, then the value dozen must be present in a related table or list of values as a valid unit of measure). This code is usually extremely complex to write and maintain. Appendix A shows a sample portion of a SQL*Loader script that might be used to load vendor information. Appendix B is an extract of sample SQL code used to check for data dependencies prior to loading accounts receivable data. A typical company will have more than 100 of these SQL scripts to code and maintain to convert their data for just financial applications.

A second method to load data is to cut and paste that data from a spreadsheet. Records copied from a spreadsheet and using a Microsoft Windows® paste function are inserted into an Oracle table. Subsequent manipulation of the data similar to that of the traditional method (FIG. 1) is performed by a programmer using SQL code to add additional required fields, validate the data, and enforce dependencies. Again, an intermediate table or application programmatic interfaces may be used prior to loading the data into the final application tables.

The third method of converting data is to utilize a tool to populate Oracle tables. The tools currently on the market generate the SQL code to map source fields to destination fields. Some of these tools allow for adding required fields or check for data validation or enforce data dependencies, but these checks are hard-coded into the SQL script for specified tables. Very few of the tools enforce referential integrity and maintain foreign key relationships. Prior art utilizes programs (generally in SQL) to move data from an old database to a new one. These tools generate the SQL code interactively (e.g. table by table, and, in many cases, instruction by instruction).

The final method is to manually enter data into the new application tables usually from a print out or report of the source data.

The following table indicates products of different companies, their functionality and their limitations:

| Company | Product | Functionality | Limitations |
| --- | --- | --- | --- |
| SMART Corp. | Smart DB | Transforms and maps legacy data to new application. Generates and executes SQL code to insert, update, or delete data. Graphically joins tables and views. Manipulates data values among multiple tables. | Performs no other function except conversion, and then only translates and transforms the values of the data. The product maps table to table, rather than understanding the relationships in the entire application. It can only accommodate data that originates in one table with a single destination table. Does not enforce referential integrity, data dependencies, uniqueness constraints. Does not provide patterns, pre-defined migration rules. Audit Trail not complete enough to reverse transactions. Some pre-defined templates are provided for Oracle Applications ™. Requires recoding, and new template definition for new or updated versions of the destination tables. |
| Constellar Corp. | Constellar Hub | Ongoing moving of transaction and operational data to and from legacy systems into databases (Oracle, DB/2, Informix, IDMS) and files. Populating and refreshing of data warehouses. Generates C, Cobol and Pro*C source code. Uses Transformation Definition Language to create business rules to filter data. Supports data dictionary and CASE repositories in the transformation of data. Constantly sits on network and manages data flow. | Requires expert knowledge of programming languages (Cobol, SQL, C) and Oracle7 ® architecture. Does not appear to enforce referential integrity, data dependencies, uniqueness constraints. Performs no functions other than conversion and data mining. Does not provide patterns, pre-defined migration rules. Requires recoding for new or updated versions of the destination tables. Does not come seeded with data particular to Oracle Applications ™, or with predefined migration rules. |
| Oracle Corp. | Data Conversion Tool (part of Enterprise Data Management System) (DCT) | Stores data in a central repository. Manages data conversions by generating code to map data from legacy systems to Oracle ® databases or from Oracle to a flat file. DCT mines transactions for data warehouse | DCT has no drivers or control files specific to Oracle Applications ™. DCT has no predefined rules for migrating data and maintaining relational and data integrity. The user must specify the order of the conversion execution. DCT alone does not enforce referential integrity, data dependencies, or uniqueness constraints. DCT requires extensive |

-continued

| Company | Product | Functionality | Limitations |
|---|---|---|---|
| | | and data marts and performs an actual extract of legacy data. Uses gateways for non-Oracle systems to create extracts of legacy data. DCT can convert flat files to relational tables, or tables to flat files. | programming expertise in SQL and PL/SQL to define the conditions of data transfer, and to create the load packages. DCT requires knowledge of relational database architecture and the design of the destination system, and knowledge of the SQL*Loader utility's concepts and features to define the migration process. Performs no other function except conversion. Does not provide patterns, pre-defined migration rules. Only supports conversion to a single destination table for each result. In other words, for a source to load more than one destination table would require the user to define separate conversion groups and create separate SQL scripts. Does not support one-to-one or many-to-one transformations within a single conversion group. The DCT user must write and test his own SQL scripts and PL/SQL packages for transformation of the data. The user must also create the required cursors for each group. The user creates a script that executes the stored procedures and passes the needed parameters to schedule and control the migration process. For a file based conversion, the control script must also FTP the files to the destination system and then execute a SQL*Loader process to perform the data load. |
| Chain Link Technologies, Inc. | Chain Link Object Migrator Chain Link Migration Manager | Manages multiple instances of the Application Object Library ™ tables across multiple Oracle ® RDBMS environments (production, test, development, etc.) Migrates data from Application Object Library ™ tables to different Oracle database instances. | Only migrates a small set of Oracle Application Object Library ™ tables. Performs no other function except migration to different database instances. Does not provide patterns, pre-defined migration rules, translation, or transformation of data. Requires recoding for new or updated versions of the destination tables. |
| Rockport Software, Inc. | Conversion Toolbox | The Conversion Toolbox performs conversion of data from a legacy system into selected Oracle Applications ™ tables. The product also claims to be able to support two way interfaces, and support changes to the accounting flexfield, although the latter functionality was not complete in the version of the software evaluated. The software dynamically generates driver tables to migrate the data and validate data dependencies. It allows for translation of values and addition of new required data to intermediate tables. These driver tables provide generic migration instructions to the toolbox. In other words, the Conversion Toolbox allows the user to create templates to generate the migration instructions. These migration instructions use predefined driver tables to move the data from the source to the destination. The Conversion Toolbox uses a single intermediate table to translate and transform the data. This use of a single table limits the migration to a single destination table and makes the enforcement of referential integrity depend on the user's knowledge of the precise migration order that must be followed to move the data. Using the Conversion Toolbox, the user might have to define thousands of templates to migrate an entire application and keep track of the order of migration in order to ensure that all of the templates are applied in the proper sequence. | Conversion Toolbox does not provide for generation of data translation or transformation instructions. It allows a user to change values (e.g. from doz. to dozen), but does not provide any rules or conditionals for doing so. The user merely indicates the new value (field-by-field) to be moved to the destination tables. The mapping facility of the Conversion Toolbox is limited and allows only for single source to a single destination table translation. The actual values in the source are not displayed on the screen within the software. The user must define the translated values based on prior knowledge of the legacy system's data. The Conversion Toolbox can only be used for conversions and table-to-table mapping. Conversion Toolbox has no predefined templates. Does not provide patterns, predefined migration rules. Audit Trail not complete enough to reverse transactions. Does not enforce referential integrity, uniqueness constraints without significant user input. Performs no other function except conversion. |

U.S. Pat. No. 5,596,746 discloses a method and system to transform relational data models into object models (input and output to modeling tool). The invention has the following features:

User must have a database design;

Generates SQL Code;

Uses graphic depiction of entity relationship model rather than the unique identifier;

Creates data dictionary;

Stores tables and data models rather than dynamically creating insert records;

Creates the data model rather than populating the tables with new data;

User needs to input primary keys;

Populate refers to insertion of object name (such as table and column names) rather than load data.

U.S. Pat. Nos. 5,566,332; 5,416,917; and 5,278,978 disclose inventions which refer to transferring data between dissimilar hardware environments. The transfer is only between two relational database management systems. They deal with the types of storage on different machines (e.g. whether numeric data is physically stored in a low to high order sequence or a high to low sequence). They are based on machine and system descriptors to establish links between two relational database systems.

U.S. Pat. No. 5,379,419 discloses a method and system to decode relational queries into a set of common data file commands to retrieve data in non-relational formats.

SUMMARY OF THE INVENTION

An object of the present invention is to provide a method and system for migrating data without writing any code but rather using migration rules and the use of patterns to translate and transform the data to be mapped. The invention dynamically employs the rules and patterns which enforce referential integrity, validate data dependencies, check for uniqueness constraints, ensure that mandatory fields are populated, and verify the format of the data before the data is loaded into the destination tables.

The invention uses patterns and conditionals to accommodate all of the different translations and transformations of data.

The invention allows for population of any relational database tables as the destination. Using level coding, the invention is able to automatically sequence the loading of data so that referential integrity of the destination is maintained.

The invention knows the data schema of all the Oracle Applications™ tables (in contrast to the Conversion Toolbox which has driver tables for a small subset of the major Oracle Applications™ tables) and has the migration rules and dependencies predefined. Using the invention, multiple migration rules and data translation and transformation patterns are applied to a source so that multiple records and tables can be updated simultaneously and in the proper sequence. The Conversion Toolbox, on the other hand, requires the user to define templates on a field-by-field basis. The invention also allows for the definition of new destination tables.

In addition to supporting conversion efforts, the invention provides support for performing consolidation, restoration from an archive, migration to new instances, upgrading to a new release, adding bolt-ons and enhancements, and changing business requirements.

The audit trail in the invention is complete enough that the entire migration process can be reversed without compromising the integrity of either the source or the destination application.

In carrying out the above object and other objects of the present invention, the invention provides an automated computer-implemented method for migrating source data from at least one source to at least one destination table of a database having a schema without a user having to write computer code. The method includes the steps of defining patterns which describe format and content of the source data, applying the patterns to the source data to create transformed data and associating migration rules based on the schema with the patterns to generate a set of instructions that define migration paths. The method also includes the steps of loading the transformed data in a sequence into the at least one destination table based on the set of instructions, the at least one destination table having a defined format and field.

The method further includes the step of loading the data from the at least one source into at least one temporary table having source and destination fields. The at least one temporary table is a relational database table. When the at least one source is an ASCII file, the method further includes the steps of creating an extract table with the data from the at least one source and loading the extract table into the at least one temporary table. When the at least one source is a relational database table, the step of loading the data from the at least one source includes the step of automatically loading the relational database table into the at least one temporary table.

The method preferably includes the steps of associating the source fields with the destination fields based on the schema and creating templates for transforming the data from the at least one source based on the schema to obtain the transformed data.

The method also preferably includes the steps of creating at least one intermediate table having a format and fields and linking the at least one temporary table and its fields with the at least one intermediate table and its fields. The format and the fields of the at least one intermediate table are substantially identical to the format and fields of the at least one destination table. The transformed data is utilized to populate the at least one intermediate table.

The step of creating the templates can be performed interactively with the user.

The templates include data migration patterns and logical operators to provide instructions for translating and transforming the data from the at least one source.

The patterns may include a transfer mapping pattern, a monovariate translation pattern, a multivariate concatenation translation pattern, a multivariate reverse concatenation translation pattern and/or a multivariate transformation pattern.

The step of generating the set of instructions is preferably based on the templates and the database schema and the step of loading the transformed data includes the step of moving the data from the at least one source to the at least one temporary table where it is translated and transformed and then to the at least one intermediate table for validation and correction to obtain validated and corrected data.

The method preferably further includes the step of grouping the templates into batches.

The data base is preferably a relational data base and the at least one destination table is a relational database table.

Preferably, the step of loading is automatically sequenced so that referential integrity is maintained.

Preferably, the data may be migrated from a plurality of sources.

Preferably, the transformed data loaded into the at least one destination table may update or add to records already in the at least one destination table.

Further in carrying out the above object and other objects of the present invention, a computer system is provided including a migration engine for migrating data from at least one source to at least one destination table of a database having a schema without a user having to write computer code. The migration engine includes a data map architect and an update processor for carrying out the above-mentioned steps.

The data map architect, for example, provides:

1. Definition of mapping patterns for transferring, translating, and transforming the format, content, and characteristics of source data including:
   a) Transfer Mapping;
   b) Monovariate Translation;
   c) Multivariate Concatenation Translation;
   d) Multivariate Reverse Concatenation Translation; and
   e) Multivariate Transformation.
   f) Parsing, combining, adding to, or changing the format or content of the source data.
   g) Specification of constraints or conditions under which these mapping patterns apply.
      i) Applies IF-THEN-ELSE logic to automatically generate destination values.
      ii) Applies conditionals to multiple records simultaneously.
   h) Association of source data with the format, content, and characteristics of the destination data.
   i) Analysis of the patterns and conditionals defined for logical application to the source data.
2. Generation of migration instructions that utilize the mapping patterns for moving data from one or more source tables to one or more destination tables.
   a) Validates that mandatory fields are populated.
   b) Adds additional data required by the destination.
   c) Determines where to put source data that doesn't have a corresponding field in the destination.

The update processor, for example, provides:

1. Definition of rules that check for uniqueness constraints, verify data dependencies, enforce referential integrity, and specify order of operations for moving the data into the destination system wherein:
   a) Rules are based on pre-defined hierarchies or nesting of relationship in the destination system.
   b) These rules control the migration process.
2. Aggregation of mapping patterns into templates that provide instructions to transfer, translate, or transform the source data.
   a) Definition of hierarchies of templates based on principles of relational database design.
   b) Grouping of templates together to move a particular type or types of data.
   c) Iterative processing of the mapping patterns until all of the source data has been transferred, translated, or transformed.
3. Creation of batches of templates and rules to populate destination tables.
   a) Addition of control fields to batches to maintain audit history of transaction processing.
   b) Ability to schedule the running of batches and specify the order of processing.
4. Utilization of the templates and migration rules to derive values that populate the destination tables.
5. Verification of the integrity of the destination data prior to loading into the destination tables.
   a) Checks uniqueness constraints.
   b) Validates population of mandatory fields in the destination system.
   c) Confirms that data dependency requirements are satisfied.
   d) Enforces referential integrity.
   e) Maintains a logical order of operations in application of templates and rules.
6. Trial runs of the data migration, identification of errors, and correction of potential errors before committing the data to the destination tables.
   a) A transaction report identifies errors.
   b) The transaction report notes errors that fail uniqueness, data validation and violate dependency rules.
   c) No records containing errors are written to destination tables.
   d) Individual or mass corrections.
      i) Identify a specific record to change or browse through all error records in the batch, making changes as desired; and
      ii) Correct all occurrences of an error in one step;
   e) A change history of corrections is made so that the data in the destination remains consistent with that in the source and an audit trail is maintained.
   f) The entire migration process can be reversed so that the destination data remains intact and in the same condition as before the migration took place.
7. Definition of parameters and rules to allow for either the insertion of new data or the update of existing data into the destination system.

The method and system of the present invention generally:

Allow for the consolidation of data into a single destination system from multiple source systems.

Include changing or modifying the content, format, or characteristics of data as business requirements or systems change.

Restore archived data to a current database.

Migrate data from one database instance or installation to another.

Integrate enhancements, bolt-ons, and modifications to a relational application.

Convert data from a legacy system to a new system.

Consolidate multiple installations of a subledger into a multiorg environment.

Support the consolidation of systems to support mergers or acquisitions.

Add additional data or populate multiple tables simultaneously.

Migrate data from a development, to a test, to a training, or to a production environment, without having to reconfigure the setup parameters each time.

The computer-implemented method defines new destination tables and automatically generates the migration rules for these new destination tables based on predefined patterns.

The method and system of the present invention also generally:

Allow for definition of data dependencies in the destination.

Allow for definition of primary keys, check constraints, and uniqueness in the destination that maintain constraints to ensure the data integrity of the destination tables.

Allow for definition of relationships and foreign keys in the destination that, in turn, allow for maintaining referential integrity.

Allow for assigning order of operations to the processing of templates by using level coding algorithms for relationships that identify those destination tables with the fewest relationships to populate first, and progressing sequentially through the more complex relationships.

Provide for definition of seeded data that identifies data and referential dependencies within Oracle Applications™.

Allow the characteristics of every Oracle Applications™ table to be pre-defined.

Preferably, all of the patterns and migration instructions are table-driven and require no coding from the user.

| Definitions | |
|---|---|
| Batch | A group of template-generated data and migration rules that are uploaded into the intermediate or destination tables simultaneously. |
| Conditionals | Rules that define how data is to be translated or transformed prior to loading in destination tables. |
| Data Dependency | The value of the data in one field is dependent on the value of the data in another field. |
| Data Map Architect | The part of the invention that prepares the source data and establishes the mapping constraints on the format and content of the data to be migrated from the source to the destination. |
| Data Migration Rules | Pre-defined templates based on the knowledge of the Destination tables that enforce template order, migration load sequence, referential integrity, uniqueness constraints, and data dependencies. |
| Destination Application | A group of destination tables linked through data relationships. Pointers in the application designate locations of related destination tables through use of the unique identifiers of those tables. |
| Destination Table | A table within a database such as an Oracle database to which data is migrated using the invention. The characteristics of the Destination Tables dictate the migration rules the invention follows to populate the data. |
| Intermediate Table | A database table such as an Oracle table into which the source data is loaded in order for the invention to add migration or transformation batch control fields. The invention uses an Intermediate Table to manipulate the data prior to moving that data into the Destination Tables. The format and fields in the Intermediate Table are identical to those of the destination table. |
| Level Coding | Process to locate and update records by which the tables with no foreign key relationships are populated first, then the table with a single foreign key to the first table is populated, building up until the tables with multiple different foreign key relationships are populated and the relationships are maintained throughout the destination application. |

| Definitions | |
|---|---|
| Pattern | Description of the relationship type that the Migration Engine uses to create rules that enforce referential and data integrity as it moves data from the Source to the Destination. |
| Mapping | The process used by the invention to match the data values, the data format, and the context of the data, between the source data and the destination table. |
| Migration Engine | Transfers, translates, and transforms the format and content of data values from a Source Application to the format and characteristics of the values required by the Destination Application. Applies mapping templates and utilizes intelligence about the destination tables, the relationships among the data, the unique identifiers of the data, the validation, and data dependencies required in the destination tables to create a set of migration rules. Populates destination tables by generating defined migration paths. |
| Monovariate Translation Pattern | The value A in Source Field is translated into a different value in Destination Field. Monovariate Translation Pattern changes the format of a value or a constant in the Source to a new format or value in the Destination. This translation occurs 100% of the time. |
| Multivariate Concatenation Translation Pattern | A Multivariate Concatenation Translation Pattern derives a single Destination Value from multiple Source Values. |
| Multivariate Reverse Concatenation Translation Pattern | Multivariate Reverse Concatenation patterns take one field from the Source and create many fields in the Destination Tables. This Pattern usually occurs when a value represents a concatenated value in the Source. |
| Multivariate Transformation Pattern | A Multivariate Transformation derives multiple Destination Values from multiple Source Values. |
| Referential Integrity | Maintenance of the foreign key information for a relational database. FIG. 2 shows a foreign key relationship. |
| Schema | The definition or description of the logical structure of a database such as attributes (fields) and domains and parameters of the attributes. The schema determines the migration characteristics of the destination. |
| Sequence Rules | The order in which update instructions and templates are applied to a destination table by the invention. Since templates can overwrite the previous value in a field, applying templates out of order can affect data integrity. Sequencing allows the user to control the ending values. |
| Source Data | The original data either in an ASCII file or a table of a database such as an Oracle table. This data will either be migrated to or transformed into the destination table by the invention. |
| Template | Groups of values, patterns and rules that provide instructions to the update Processor. The invention copies template-generated values to corresponding fields in a destination table. The invention allows for application of templates across multiple records simultaneously. |

-continued

| | Definitions |
|---|---|
| Template Order | The invention orders the application of the generated templates using principles of relational database design in a sequence to maintain the referential and data integrity of the migration process. (Also see Sequence Rules.) |
| Transfer Mapping Pattern | The value A in Source Field is inserted into the value A in Destination Field. This data is in the same format in both the Source and Destination. No changes are required. |
| Update Processor | Utilizes the templates created with the Data Map Architect to generate a set of instructions that define migration paths from the source data to the destination tables and populate the destination tables. |
| Validation | The process used by the invention to make sure that resulting data values are among the range of valid values in the destination application. |

The above object and other objects, features and advantages of the present invention are readily apparent from the following detailed description of the best mode for carrying out the invention when taken in connection with the accompanying drawings.

BRIEF DESCRIPTION OF THE DRAWING FIGURES

BEST MODE FOR CARRYING OUT THE INVENTION

Figure 1:
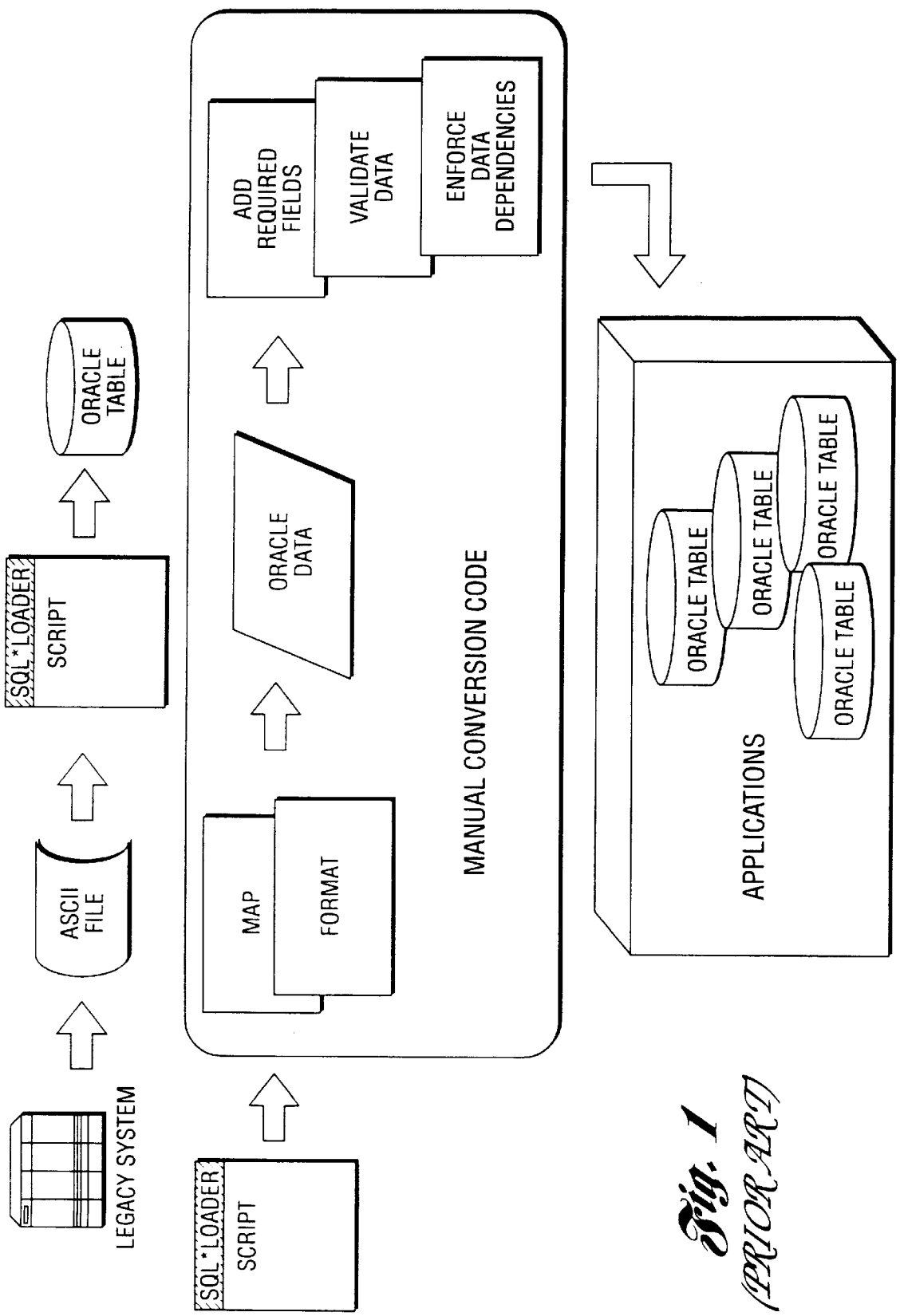
FIG. 1 is a schematic diagram of a traditional prior art data conversion approach.
Figure 2:
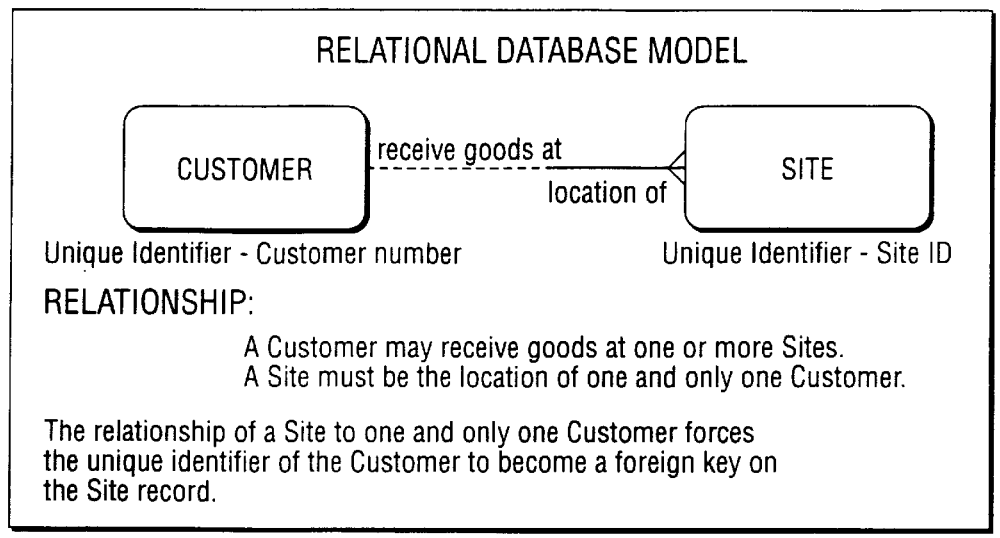
FIG. 2 is a schematic diagram which assists in the definition of referential integrity.

In general, the method and system of the present invention relate to the migration, conversion, consolidation and restoration of data. More particularly, the invention relates to an automated computer-implemented method and computer system that assists users to convert to new Oracle-based applications, to change the configuration of those applications, to operate those applications in a distributed environment, to interface with related applications, to consolidate data from different database instances or different applications, or to restore archived data into a current database without creating code.

The method and system of this invention simplifies data migration by automating processes required to update or insert data into Oracle tables without coding. The core technology used in the invention is called the Migration Engine. The Migration Engine has two major components: the Data Map Architect and the Update Processor. Each of these are described below with reference to FIGS. 3 and 4.

A. Data Map Architect

The Data Map Architect prepares the source data and establishes the mapping constraints on the data to be migrated. It does this by using a three step process: load the data into an Oracle temporary table, associate the source fields with the destination fields, and create templates that translate and transform the data into the format required by the destination system.

1. Load Data into a Temporary Table

There are two approaches to loading the data into a temporary table depending on whether the source data is in an ASCII file or whether it resides in another Oracle table. For data originating from a non-Oracle source, the invention provides a format for an ASCII file into which the user can extract data from a non-Oracle source and use SQL*Loader to insert the data into an Oracle temporary table. Before this invention, the user had to write validations, translations, and change the format of the data as part of coding the SQL*Loader script. Using the invention, however, the user only needs to create an extract table and dump it into the temporary Oracle table. For source data originating in an Oracle table, the invention uses an automatic upload process to load the source table to the temporary table. The format and characteristics of the data in the temporary table do not matter since the invention will later reformat the data to fit into the destination table.

2. Associate Source Fields with Destination Fields

The Data Map Architect provides a format to associate the data in the source system (which now reside in temporary tables) with the data in destination system. The Data Map Architect uses knowledge about the characteristics, structure, and format of data in the destination tables to facilitate the match between the source data and the destination table. Based on the characteristics of the destination table, the Data Map Architect creates intermediate tables. The tables and fields of the temporary tables are linked to the tables and fields of the intermediate tables which are identical to the tables and fields of the destination tables.

3. Create Templates for Data Mapping

The Data Map Architect allows the user to interactively create templates to govern mapping, translating, transforming the data in the fields of the source data to the fields in the destination table without coding. These templates use pre-defined data migration patterns and logical operators to provide instructions that translate and transform the source data into data with the same characteristics and format of that in the destination tables. The templates identify the migration or transformation parameters that control the movement of data to a specific destination table.

B. Update Processor

The Update Processor utilizes the principles of relational database design to enforce pre-defined Data Migration Rules templates. Using an aggregation of the pattern templates created by the Data Map Architect, the Data Migration Rules templates, and intelligence about the structure of the destination tables, the Update Processor dynamically generates and spawns a set of instructions that manipulate the data and move it from the temporary tables to the Intermediate Tables and ultimately to the Destination Tables.

The Update Processor groups the templates into batches, adds fields for processing control, and creates and maintains control files that monitor the data migration process. Because the Update Processor already knows the data schema of the destination tables (including required validations and dependency rules of the destination tables), the invention defines template dependencies, creates template hierarchies, and sequences templates to be run. A template dependency stipulates that one template cannot be run until prerequisite templates are run (e.g. The Data Migration Rules know that a template that enters account distributions can not be run until the template that populates the account value tables is run). The invention has patterns for defining new destination tables that the user can apply. A user can define new destination tables if the relationships and keys are known. The user defines the new destination to the invention and the invention automatically generates the appropriate migration rules. The invention has pre-defined template hierarchies or the user can create case-specific parent-child templates. In other words, a template for a vendor hierarchy might include child templates for vendors, vendor addresses, and vendor contacts that would all be run together.

The user can specify a order in which the batches are run and can schedule a time for the batch run or can schedule periodic batch runs (9:00 a.m. every Monday for three months). Utilizing batches allows the user to optimize performance and also to reduce the resource contentions during peak times.

When the batch is run, the Update Processor uses the templates (created by the Data Map Architect) to generate values to populate the intermediate table. The templates provide translation and transformation parameters. The invention uses generic rules and variables to enforce data and referential integrity, to verify uniqueness, and to sequence the data load. The Update Processor substitutes the specific parameters created by the templates for the many generic variables already defined in the invention to align with the characteristics of specific Destination Tables. Based on the templates, the Update Processor populates values in the Intermediate Table from those in the temporary table.

This is an iterative process that results in all of the records from the source system being translated, transformed, or migrated into the destination application in a defined sequence. The parameters and procedures embedded within the Data Migration Rules templates validate data, verify uniqueness constraints, enforce data dependencies, and maintain referential integrity (foreign key relationships). If the data passes all of the tests of the Data Migration Rules templates, the Update Processor loads it into the intermediate tables for user review and correction. Records that do not pass the tests are loaded into an error file for correction and resubmission. Finally, the Update Processor passes the corrected data to the final destination tables. For each upload batch, the Upload Processor tracks the batch number, the batch date, the record count, the items added, and error items. The Update Processor maintains an audit trail of the upload function so that the upload process can be reversed if necessary.

Methodology and Logic

The logic behind the Migration Engine accommodates the universe of possible data modeling relationships in mapping Source Data to Destination Data. The invention has pre-defined pattern templates to assist with the mapping of each of these relationships. The methodology is to separate the Source Fields into a series of data patterns for these logical relationships. These relationship patterns are described below with examples.

| Relationship Type | Migration Engine Pattern Name | Explanation/Example |
| --- | --- | --- |
| One-to-One (1:1) | Transfer Mapping | The value A in Source Field is inserted as the value A in Destination Field. This data is in the same format in both the Source and Destination. No changes are required. Ven-Name in Source = VENDOR_NAME in Destination. Source Value "Smith" Destination Value "Smith" |
| One-to-One (1:1) | Monovariate Translation | The value A in Source Field is translated into a different value in Destination Field. Monovariate Translation Pattern changes the format of a value or a constant in the Source to a new format or value in the Destination. This translation occurs 100% of the time. Unit-of-Measure in Source = UNIT_OF_MEASURE in Destination. "DZ" in Source Field "DOZ" in Destination Field. |
| Many-to-One (M:1) | Multivariate Concatenation Translation | A Multivariate Concatenation Translation Pattern derives a single Destination Value from multiple Source Values. "Accounting Code Combination" in the Destination might be derived from the combination of "Segment_1", "Segment_2," and "Segment_3" in the Source Table. |
| One-to-Many (1:M) | Multivariate Reverse Concatenation Translation | Multivariate Reverse Concatenation patterns take one field from the Source and create many fields in the Destination Tables. Source Item Number "R075" might create a color code value of "Red" in the Destination Field "Color" and a Item Number of "075" in the Destination Field "Item Number"). This Pattern usually occurs when a value represents a concatenated value in the Source. |
| Many-to-Many (M:M) | Multivariate Transformation | A Multivariate Transformation derives multiple Destination Values from multiple Source Values. A vendor having multiple addresses that is listed as separate vendor records in a Source application may be translated to a single vendor record in the Destination with multiple sites. This Pattern can also be used for many-to-one transformations instead of Multivariate Concatenation Translation when the Source fields interact to derive the Destination data, such as multiplying number of units by unit price in the Source to get a total cost value in the Destination. |

The Migration Engine allows a user to specify constraints or conditions under which each of these relationship patterns apply to the Source data. The invention allows the user to associate the Patterns to the Source Data and then the Migration Engine derives the resulting data on the destination tables. (e.g. if a "date created" value on a Source invoice record is more than ten years ago, the user would specify a Monovariate Translation Pattern to assign the invoice record a status of "inactive" on the Destination Table).

Conditionals are specified as an IF THEN, ELSE logical algorithm which the user defines in the Data Map Architect component of the invention for each Source Field. The conditionals apply mathematical operators of "Equal to", "Less than", "Greater than", "Less than or equal to", "Greater than or equal to", "Between" and variables such as "Null" or "Not Null" to the conditionals. The Data Map Architect allows the user to specify "AND" and "OR" conditions as well.

Translation Functions (Left Pad, Right Pad, Left Trim, Right Trim, Decode, Convert to Date, Convert to Number, Change to Upper Case) are also available to insert into the Conditional. The values to be operated on by the conditionals can be a constant, a variable, a range of values, values in another field, a random number, or an arithmetic operator.

The Data Map Architect links the Relationship Patterns and conditionals together to support the user in associating the values in each Source Field with the correct values in the Destination Field. It does this by processing the values and operators in each of the defined conditionals to prescribe the Mapping, Translation, and Transformational Rule Patterns listed above.

The Update Processor applies the patterns that are defined in the Data Map Architect and creates Templates that control the content and format of the data in the Intermediate and Destination Tables. The Update Processor initially applies these templates to the data in the temporary tables to move the data to the Intermediate tables. All of the manipulation of data occurs in the Intermediate table. It is then tested, corrected by the user as needed, and moved as is to the Destination Table. The Migration Rules templates are based on the characteristics of the data and the relationships that exist in the Destination system. Through the Migration Rules Templates, the Update Processor enforces the rules of relational design including referential integrity (maintenance of foreign key relationships), validation of data dependencies, uniqueness, and order of operations, as the data is migrated to the Destination Tables.

Features of Invention

Figure 3:
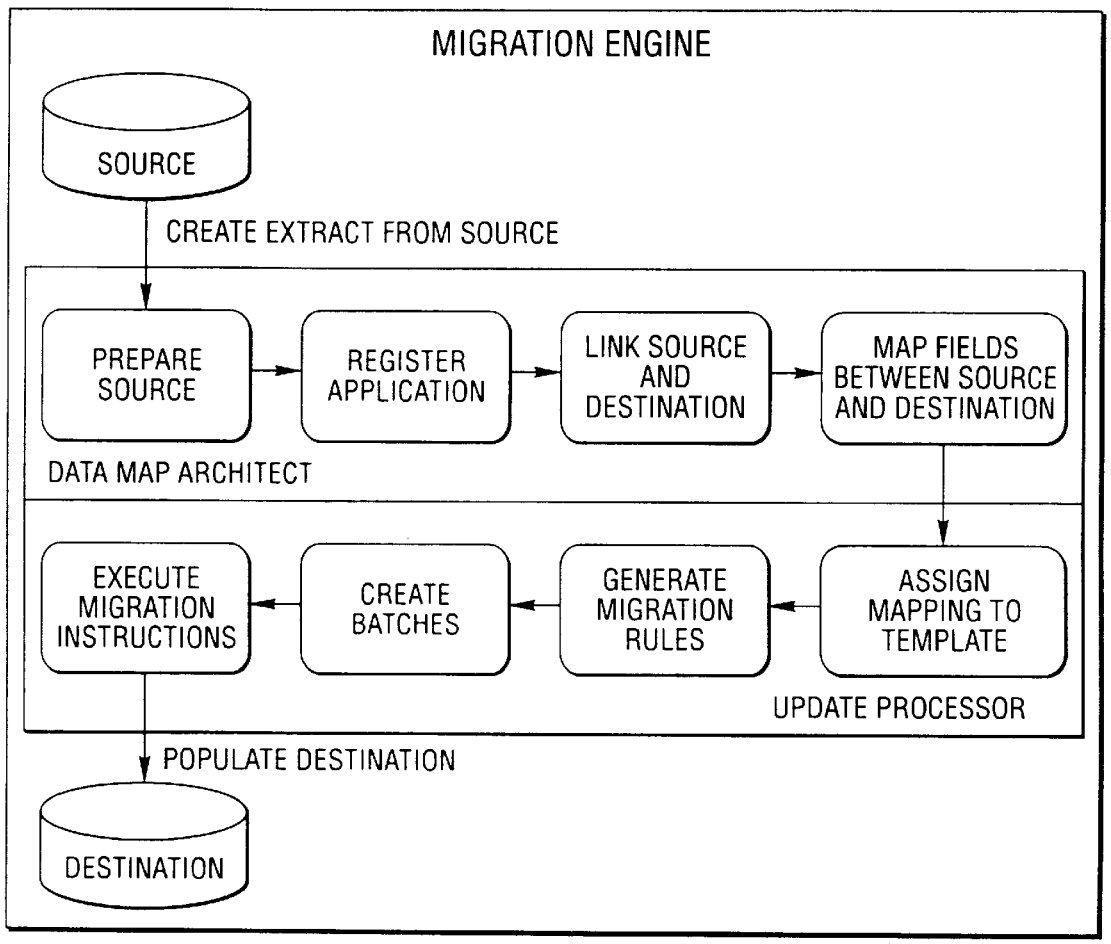
FIG. 3 is a schematic diagram which shows the major features of the invention.
Figure 4:
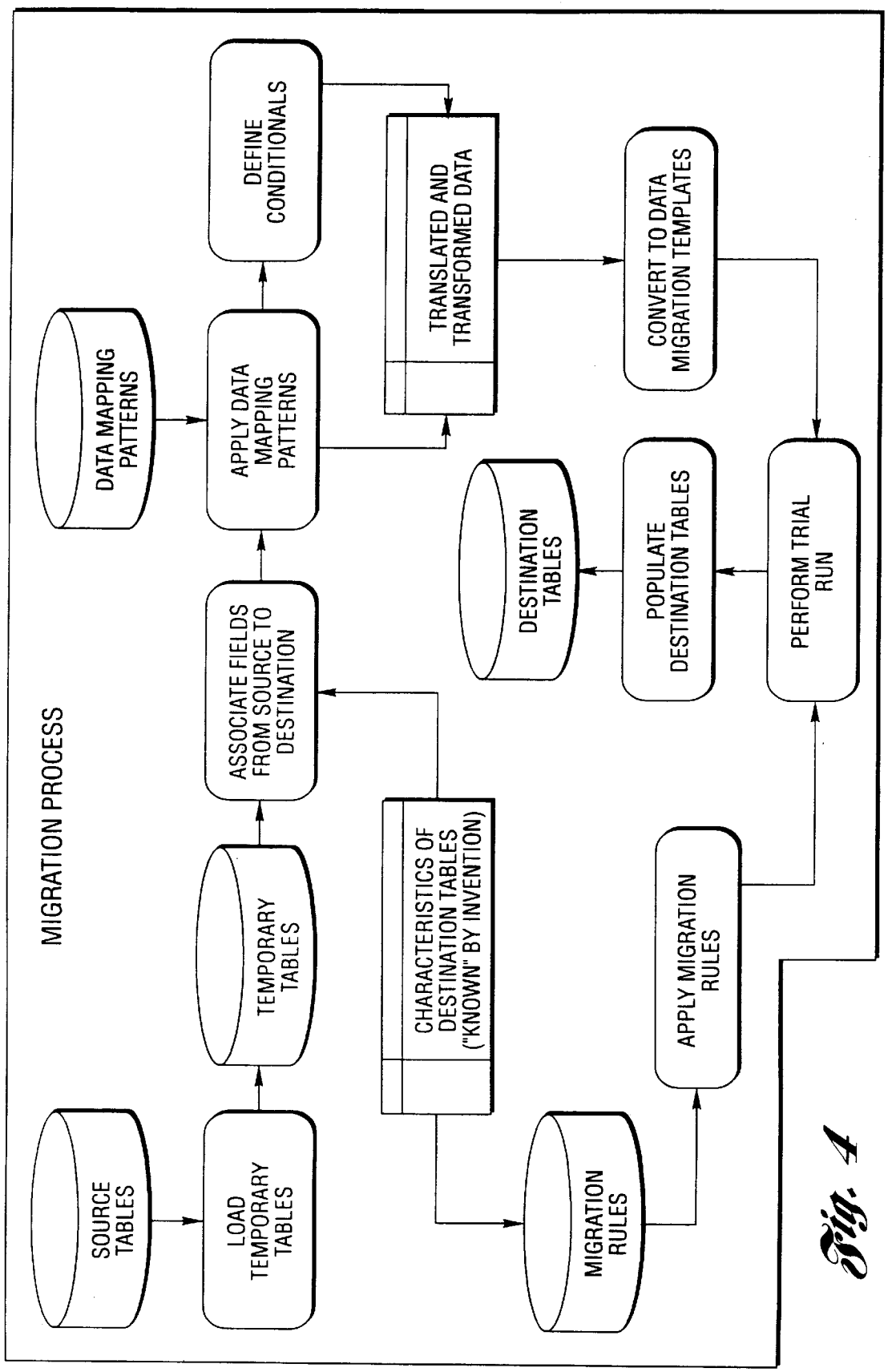
FIG. 4 is a block diagram flow chart which shows the migration process.

FIG. 3 shows the major features of this invention. Each of these are explained in further detail below:

Migration Engine

The Migration Engine has two component parts: the Data Map Architect and the Update Processor. The Migration engine uses the patterns and conditionals of the Data Map Architect to define the instructions for translating or transforming the data. The Update Processor automatically generates these instructions, and, using predefined Migration Rules, populates the Intermediate Tables.

Data Map Architect

The Data Map Architect provides a format for identifying the characteristics of the source data. The invention allows the user to determine whether the data is to be transferred unchanged, or whether the data must be changed before migrating to the destination. The invention employs pattern recognition techniques to determine the required changes. If the data is to be changed, the Data Map Architect provides a format for specifying the conditions of change, the changed value, the translation parameters, or the transformation algorithm. These patterns are aggregated into templates that allow multiple conditionals to be applied and multiple records to be updated simultaneously. The invention verifies the changed data and ensures consistency with the data of the destination table.

Update Processor

The Update Processor identifies the characteristics of the destination tables that will be updated, designates the fields within the destination tables that will be validated, and retrieves the proper foreign key relationships. The templates are read to develop data migration paths to destination tables automatically. The invention identifies migration parameters that will control the movement of data to a specific destination. The Update Processor creates or adds to existing records and inserts them into the destination tables. Utilizing this invention requires no knowledge of programming languages, database architecture, or SQL code. Migration rules for new destination applications will be created by identifying the schema definitions of the new destination.

Batches

Templates are aggregated into Batches for processing. These batches can be scheduled to run at a predefined time. The invention allows a Batch to be reversed so that the user can return the data to its original state before data was loaded.

Dependency Checking

The invention automatically tests to see whether the values stored in various columns within each record are logically consistent with one another. All data dependency checking is table driven rather than utilizing complex SQL logic or programming.

Mandatory Data

The invention verifies that all mandatory fields in the destination have been populated.

Migration Rules

The invention has predefined migration rules to enforce referential integrity and determine the order of operations. The invention uses level coding to determine the proper sequence of loading the data into the destination tables. A level coding algorithm used to enforce referential integrity in a destination system is defined as follows:

Identify all tables involved in migration (original tables).

Identify all foreign key constraints in the destination system.

Insert a record for the table name of all tables for which the original table is a foreign key for another table in a foreign key column. (This will usually be a one relationship on the original table and a many relationship for the table on which the original table is a foreign key in the physical database schema).

Sort the records in the foreign key column on table name.

Count the number of foreign key relationship records for each table.

Assign a sequence number of 1 to the table used most often in a foreign key relationship.

Continue assigning a sequence number to the tables, going from the most number of relationships to the least number of foreign key relationships.

Populate those tables with the most foreign key relationship (having the sequence numbers beginning with 1) records first.

Locate those tables that have a relationship with the tables that were populated initially and assign the next sequence number.

Proceed iteratively in sequence number order until all tables in the migration used as foreign keys are populated.

Finally, populate those tables which do not have foreign key references to other tables until all tables have been populated.

Proper sequencing of the database load allows related records in different tables to point to one another.

Patterns

The invention defines patterns that accommodate the principles of relational design. The user defines these patterns by stating values in conditional patterns. These patterns are combined into templates to assist with the mapping of each of the source fields to the destination fields. These conditionals are applied to the definition of these patterns so that the invention can generate migration instructions.

Templates

The invention's use of templates for all destination tables allows a user to perform mass changes to existing tables without writing SQL programming scripts. Templates are made up of many patterns and rules. The invention allows for the application of templates to multiple records without programming.

Uniqueness Constraints

The invention has predefined rules to enforce uniqueness constraints. The invention requires no coding to verify that an inserted value is unique.

Validation

The invention generates validations automatically. The invention validates the data prior to the update to the destination tables. The invention identifies errors and allows them to be corrected, either individually, or via a mass correction.

Functional Application

The primary function of this invention is to allow translation and transformation of data to convert from one system to another. The invention provides a format for entering the characteristics of the source data and the translation and transformation variables and the conditions of mapping the data so that the user does not have to know how to program. After the conditions are defined for each field in the source, the user creates templates to allow update to multiple source records simultaneously.

Along with these user-defined templates, the invention uses predefined patterns of data characteristics to create migration instructions to the destination.

The invention also provides predefined migration rules that enforce uniqueness constraints, maintain referential integrity, validate data dependencies, and control order of operations. Because of the generic nature of these patterns, the invention can be used to support virtually any function which involves translation, transformation, or migration of data from a source to an Oracle destination. The invention has predefined templates to support Oracle Applications™, but it is possible to use the invention's pattern definitions and rules to define migration instructions specific to any relational database or application.

While the present invention has been described with respect to specific embodiments, many variations, modifications, alterations, substitutions, and equivalents will be apparent to those skilled in the art. Accordingly, the scope and spirit of the invention in its broader aspects is not limited to the specific details or functional applications defined below.

The most basic application of the invention is data conversion. Large companies have many different incompatible systems that need to convert data into Oracle relational databases (ORACLE7® and ORACLE8®) and Oracle Applications™. Rather than manually writing code to move data from a legacy environment into Oracle, the user can use the invention to generate the conversion instructions.

Figure 5:
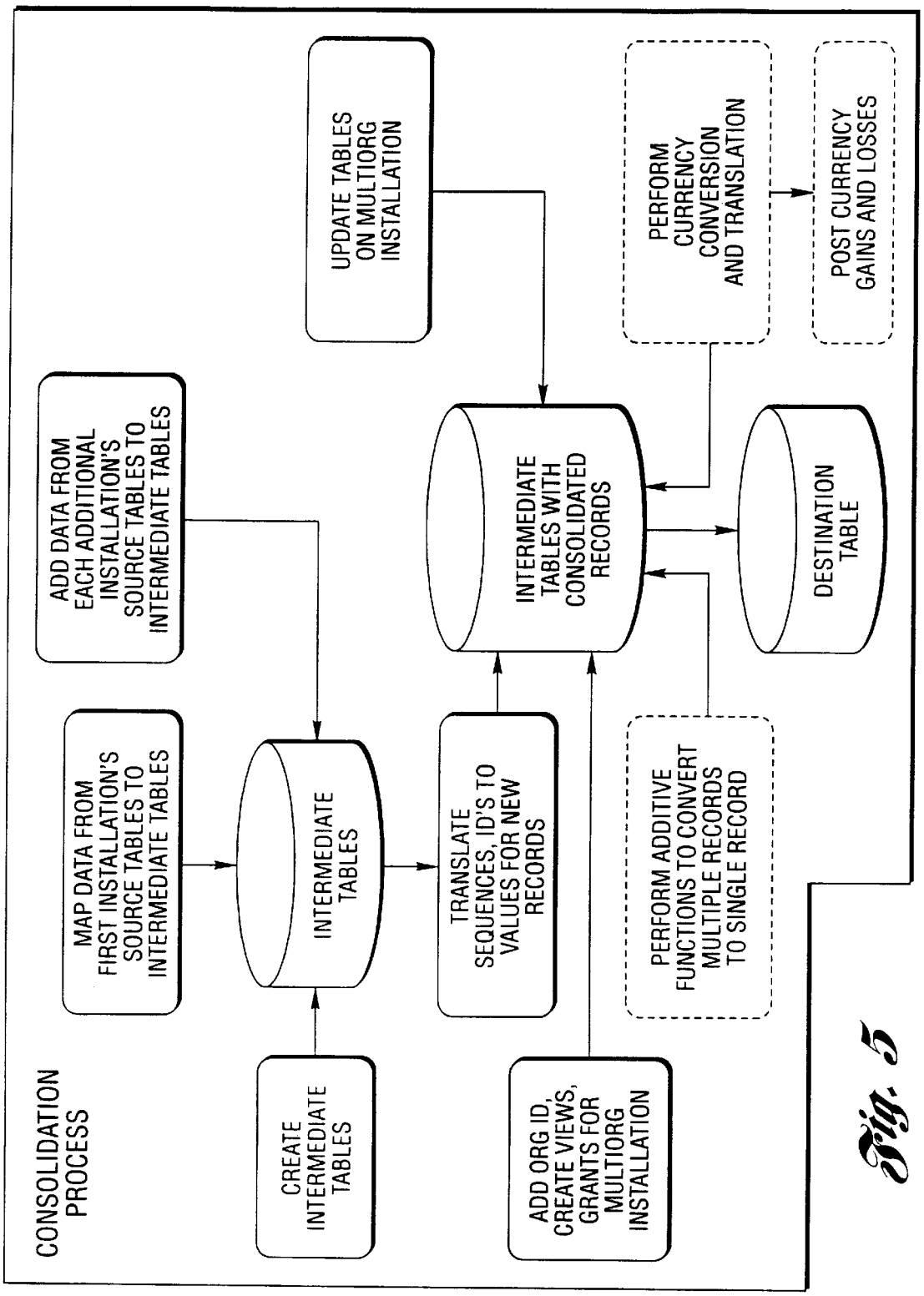
FIG. 5 is a block diagram flow chart which shows a consolidation process.

A different use of the invention is to consolidate or combine information from different sources into a single set of Oracle tables. The consolidation process also involves a migration of data from a source to a destination, but adds the functionality of being able to update or add to existing destination records, rather than merely inserting new records. The invention defines a set of rules to manage the addition of data to existing records, and allows the user to identify the conditions associated with adding data to existing tables. Examples of how this consolidation function may be used follow with reference to FIG. 5.

Companies may want to consolidate several purchase orders from purchasing systems in different locations into a single purchase order to send to a supplier. They may want to centralize their payables function in order to reduce payment processing time or leverage buying power. In order to do this, the invention allows the user to combine the purchase lines from each of the individual purchase orders together and add the quantities of individual items and the total purchase amount. The invention also provides for converting different units of measure for that item. To facilitate the combination (consolidation) process, the invention maintains an audit trail and link to the original purchase orders so that the user can drill back to the original data.

Companies also may want to consolidate several order entry systems together or combine their inventories so that they may service their customers across organization units, or around the world. The invention's data migration rules and translation and transformation patterns provide support for mapping several sources of data into a single destination.

Earlier releases of Oracle Applications™ forced multiple physical installations of the subledgers when organizations had different currencies, calendars, or charts of accounts. In these earlier releases, each subledger could have multiple copies of each of the subledger's tables. One company had 140 installations of Oracle Payables™ tables to support their business.

Oracle Applications™ now supports a "multiorg" environment with a single physical installation of the subledgers and the data partitioned by an organization unit. However, Oracle did not provide a migration path from these earlier multiple installs to a single instance of the subledgers. The invention's patterns and rules can be used to define these consolidations from multiple sources to a single destination and can use conditional statements to add the required organization information to separate the data.

The consolidation function of the invention can be used in many other circumstances. A merger or acquisition, or a selling of an organization or division, may force a consolidation of data. Many existing systems (including Oracle Applications™) do not support a distributed environment. In these systems, a purchasing system on one database instance cannot feed a payables system in a different location without writing a custom conversion routine. Oracle Applications™ do support a consolidation function, but only at the general ledger level. The invention would support consolidations across any subledger from a source located anywhere to a destination that may be in an entirely different database instance. It does this using the same knowledge about the characteristics, structure, and format of the destination tables to define data migration rules. In a similar use, the invention can take data from a single subledger and use a multivariate reverse concatenation pattern translation that will provide instructions for separating the data into multiple destinations or subledgers.

The Data Map Architect allows a user to change even the base structures of an existing application or source system as the business requirements of the organization change. The translation and transformation patterns and the migration rules dictate how the data is changed from the source to the destination. In Oracle Applications™ the base structure is called a key flexfield. These flexfields are used throughout the applications to write reports, obtain balances, or sort the data. Using the invention, a user can add new segments to the flexfield, change the size of segments, change the domains of value sets, replace values in value sets, move structures or values to different databases, or change the order of segments. All of this can be done with confidence that the data and referential integrity of the applications are maintained.

The invention also simplifies the process of creating customizations, modifications, enhancements, or adding bolt-ons to a destination because the structure and characteristics of the destination are already known. A user would merely identify the type of data to be transferred in the customization or modification and use the invention to facilitate the integration of that new data into the destination application. The Update Processor ensures consistency on the destination side and provides an audit trail to monitor the data migration from the bolt-on, enhancement, or modification. The invention's technology can also be used to assist in rewriting customizations, modifications, or enhancements to integrate with a new version of an application or a new software release. The invention uses its pre-defined migration rules to map to the new release.

The logic and methodology of the invention can also be used to restore archived versions of data to an existing system. A user might archive data (such as old invoices) after a certain period of time. However, typically, there is no way to restore that data because the current application or system has been upgraded to a new version or release, and the data format of the archived data is not compatible with the current system. Without the invention, in order to restore the archived data, a user would have to reinstall a previous version of the application and then restore the data. With the invention, restoring archived data is simply a process of using the invention's patterns for transforming the archived data into the format of the existing system. The invention makes this a routine migration effort with monovariate translation and transfer mapping patterns.

Migration of data from development, to test, to training, to production environments, or to different database instances, is also a process of applying rules and templates to source data to move data. The invention supports populating different destination environments with data that has been entered in one system. In other words, a user can set up data in one instance or environment, and then decide to move all, or part of the data, to another environment without having to redefine the setup parameters. The invention treats this as a movement of data from one Oracle table to a different Oracle table. Prior to the invention, a user would have had to move all of the existing data by exporting all of the tables in one instance or would have had to manually re-enter that data which was to be duplicated in the new environment. It was not possible to move only a portion of the data from one environment to another without destroying the referential integrity of the destination.

Another use of the invention is to automatically add additional data to many different destination tables at the same time. The invention uses the logic of a multivariate reverse concatenation translation pattern to populate the destination tables.

While the best mode for carrying out the invention has been described in detail, those familiar with the art to which this invention relates will recognize various alternative designs and embodiments for practicing the invention as defined by the following claims.

APPENDIX A

SQL*Loader script for vendor contact data file

```
Vendor_row           MD_Vendors%rowtype;
BIS_Vendor_ID            number(15);
BIS_Site_ID          number(15);
BIS_Contact_ID           number(15);
Found_Match              Boolean;
Found_Site           Boolean;
Already_Found            Boolean;
t_cnt           number;
PROCEDURE Create_Vendor_Contact (M_rowid ROWID) IS
t_contact_name       varchar2(40);
Begin
    SELECT first_name||last_name
        INTO t_contact_name
        FROM POX_VENDORS M
        WHERE M.rowid = M_rowid;
    If NOT(t_contact_name IS NULL) then
-- Get next id from unique sequence generator
        SELECT PO_VENDOR_CONTACTS_S.nextval
            INTO BIS_contact_id
            FROM DUAL;
-- insert FFIN contact information into BIS table
        INSERT INTO PO_VENDOR_CONTACTS (
            vendor_contact_id,
            last_update_date,
            last_updated_by,
            vendor_site_id,
            creation_date,
            created_by,
            first_name,
            last_name,
            area_code,
            phone)
    SELECT
        BIS_Contact_id   -- vendor_contact_id
            sysdate,       -- last_update_date
            '2',       -- last_updated_by
            BIS_site_id,       -- vendor_site_id
            sysdate,       -- creation_date
            '2',       -- created_by
            substr(M.last_name,1,decode(instr(M.last_name,' ',1,1),0,
                1,
                instr(M.last_name,' ',1,1)),--first_name
            substr(M.last_name,decode(instr(M.last_name,' ',1,1),0,
                1,
                instr(M.last_name,' ',1,1))+1), -- last_name
        M.area_code,       -- area_code
        M.phone       -- phone
```

APPENDIX A-continued

SQL*Loader script for vendor contact data file

```
        FROM POX_VENDORS M
        WHERE M.rowid = M_rowid;
      End If;
EXCEPTION
    WHEN DUP_VAL_ON_INDEX THEN
        UPDATE POX_VENDORS M
            SET error_flag = 'Y',
                error_reason = 'Duplicate Contact Key'
```

APPENDIX B

SQL Script to Check for Data Dependencies

```
- Check CUST_TRX_TYPE_NAME for UNKNOWN
            if lines_rec.cust_trx_type_name not in ('FRSI OPEN INVOICE',
                                                    'FRSI OPEN CREDIT MEM',
                                                    'FRSI OPEN DEBIT MEMO'
                                                    ) then
                lines_rec.cust_trx_type_name:='FRSI OPEN ADJ';
            end if;
-- Check for Duplicate Transaction Flexfield errors - append Description to Line Number
if lines_rec.interface_line_attribute1 = v_invoice_number and
    lines_rec.interface_line_attribute2 = v_line_number then
    lines_rec.interface_line_attribute2 := lines_rec.interface_line_attribute2
            || substr(lines_rec.description,1,10);
            duplicate_count := duplicate_count + 1;
end if;
v_line_number    := lines_rec.interface_line_attribute2;
--**** Validate Bill to Customer
    v_bill_address := lines_rec.orig_system_bill_address_ref;
    BEGIN
        SELECT addr_cust_no
            into v_bill_customer
            FROM frs_cust_addresses
        WHERE addr_orig_cust_ref||addr_orig_addr_ref||addr_site_use_code = lines_rec.orig_system_bill_address_ref;
        EXCEPTION
            WHEN NO_DATA_FOUND THEN
                dbms_output.put_line('BILL-TO Customer NOT FOUND on Mapping Table'||lines_rec.orig_system_bill_address_ref);
                v_bill_customer := '01568';
                v_bill_address := '0156800B';
    END;
--**** Validate Ship to
    v_ship_address := lines_rec.orig_system_ship_address_ref;
    BEGIN
        SELECT addr_cust_no
        INTO v_ship_customer
            FROM frs_cust_addresses
        WHERE addr_orig_cust_ref||addr_orig_addr_ref||addr_site_use_code = lines_rec.orig_system_ship_address_ref;
        EXCEPTION
            WHEN NO_DATA_FOUND THEN
                v_ship_customer := '01568';
                v_ship_address := '0156800S';
    END;
--**** UPDATE ************************************************
    UPDATE ra_interface_lines
    SET
        attribute15                 = 'Lookup Processed',
            cust_trx_type_name      = lines _rec.cust_trx_type_name,
            term_name               = lines_rec.term_name,
            interface_line_attribute2 = lines_rec.interface_line_attribute2,
            orig_system_bill_customer_ref = v_bill_customer,
        orig_system_bill_address_ref = v_bill_address,
        orig_system_ship_customer_ref = v_ship_customer,
        orig_system_ship_address_ref = v_ship_address,
        ong_system_sold_customer_ref = v_bill_customer,
        created_by                  = v_user_id,
        last_updated_by             = v_user_id
    WHERE rowid = lines_rec.rowid;
    v_commit_counter := v_commit_counter + 1;
        total_counter := total_counter + 1;
    IF v_commit_counter > 10 THEN
        COMMIT;
        v_commit_counter := 0;
            dbms_output.put_line('Total rows committed in RA_INTERFACE_LINES: ' || total_counter);
```

APPENDIX B-continued

SQL Script to Check for Data Dependencies

```
        END IF;
    END LOOP;
    dbms_output.put_line('Total rows committed in RA_INTERFACE_LINES: ' || total_counter);
    dbms_output.put_line('Total duplicate flexfields in RA_INTERFACE_LINES:'
        || duplicate_count);
update ra_interface_lines
set tax_code = 'Conversion Tax'
where trx_number in (select trx_number
                     from ra_interface_lines
          where tax_code = 'Conversion Tax');
```

What is claimed is:

1. An automated computer-implemented method for migrating source data from at least one source to at least one destination table of a database having a schema without a user having to write computer code, the method comprising the steps of:
   defining patterns which describe format and content of the source data;
   applying the patterns to the source data to create transformed data;
   associating migration rules based on the schema with the patterns to generate a set of instructions that define migration paths; and
   loading the transformed data in a sequence into the at least one destination table based on the set of instructions, the at least one destination table having a defined format and destination fields, wherein the step of loading is automatically sequenced based on the migration rules so that referential integrity is maintained.

2. The method as claimed in claim 1 further comprising the step of loading the data from the at least one source into at least one temporary table having source fields.

3. The method as claimed in claim 2 wherein the at least one temporary table is a relational database table.

4. The method as claimed in claim 2 wherein the at least one source is an ASCII file and wherein the method further comprises the steps of creating an extract table with the data from the at least one source and loading the extract table into the at least one temporary table.

5. The method as claimed in claim 2 wherein the at least one source is a relational database table and wherein the step of loading the data from the at least one source includes the step of automatically loading the relational database table into the at least one temporary table.

6. The method as claimed in claim 2 further comprising the step of associating the source fields with the destination fields.

7. The method as claimed in claim 6 further comprising the step of creating templates for transforming or translating the data from the at least one source to obtain the transformed data.

8. The method as claimed in claim 7 further comprising the step of utilizing a computer to generate user information and wherein the step of creating is based on the computer-generated user information.

9. The method as claimed in claim 8 further comprising the step of automatically inserting logical and arithmetic operators in universal or conditional statements.

10. The method as claimed in claim 6 further comprising the steps of creating at least one intermediate table having a format and fields and linking the at least one temporary table and its fields with the at least one intermediate table and its fields wherein the format and the fields of the at least one intermediate table are substantially identical to the format and fields of the at least one destination table and wherein the transformed or translated data is utilized to populate the at least one intermediate table.

11. The method as claimed in claim 7 wherein the step of creating the templates is performed interactively with the user.

12. The method as claimed in claim 7 wherein the templates include data migration patterns having conditionals with logical operators to provide instructions for translating and transforming the data from the at least one source.

13. The method as claimed in claim 12 wherein the patterns include a transfer mapping pattern.

14. The method as claimed in claim 12 wherein the patterns include a monovariate translation pattern.

15. The method as claimed in claim 12 wherein the patterns include a multivariate concatenation translation pattern.

16. The method as claimed in claim 12 wherein the patterns include a multivariate reverse concatenation translation pattern.

17. The method as claimed in claim 12 wherein the patterns include a multivariate transformation pattern.

18. The method as claimed in claim 7 wherein the set of instructions are generated based on the templates and the schema.

19. The method as claimed in claim 7 further comprising the step of utilizing the templates to validate the data in the at least one temporary table for uniqueness constraints.

20. The method as claimed in claim 7 further comprising the step of utilizing the templates to validate the data in the at least one temporary table for verifying data dependencies.

21. The method as claimed in claim 7 further comprising the step of utilizing the templates to validate the data in the at least one temporary table for enforcing referential integrity.

22. The method as claimed in claim 7 further comprising the step of utilizing the templates to validate the data in the at least one temporary table for moving the data into the at least one destination table.

23. The method as claimed in claim 7 further comprising the step of utilizing the templates to validate the data in the at least one temporary table for checking that mandatory destination fields are filled.

24. The method as claimed in claim 7 further comprising the step of grouping the templates into batches.

25. The method as claimed in claim 1 wherein the database is a relational database and the at least one destination table is a relational database table.

26. The method as claimed in claim 1 wherein the data is migrated from a plurality of sources.

27. The method as claimed in claim 1 wherein the transformed data loaded into the at least one destination table updates or adds to records already in the at least one destination table.

28. The method as claimed in claim 27 wherein the data is migrated from a plurality of sources.

29. The method as claimed in claim 1 wherein the transformed data loaded into the at least one destination table changes the data already in the at least one destination table.

30. The method as claimed in claim 29 further comprising the step of changing base configurations including flex fields.

31. The method as claimed in claim 18 further comprising the step of adding bolt-ons or other modifications to a relational application.

32. The method as claimed in claim 1 wherein archival data is restored.

33. The method as claimed in claim 1 wherein the source data is migrated for one installation or instance of the database to another.

34. The method as claimed in claim 1 wherein the source data is migrated from one version of the database to another.

35. The method as claimed in claim 1 wherein the source data is migrated across environments such as from a development environment to a test environment, a training environment or a production environment without changing setup parameters.

36. The method as claimed in claim 1 wherein the source data is converted from a legacy system to a new system.

37. The method as claimed in claim 1 wherein multiple instances of a subledger are consolidated in a multiorg environment.

38. The method as claimed in claim 1 wherein systems in support of mergers or acquisitions are consolidated.

39. The method as claimed in claim 1 wherein the transformed data is loaded into multiple destination tables substantially simultaneously and wherein the multiple tables includes at least one table which might later be loaded onto a separate system.

40. A computer-implemented system including a migration engine for migrating data from at least one source to at least one destination table of a database having a schema without a user having to write computer code, the migration engine comprising:
    a data map architect for creating a set of migration rules based on the schema; and
    an update processor for:
        generating a set of instructions that define migration paths based on the migration rules;
        transforming the data based on the set of instructions to obtain transformed data; and
        loading the transformed data in the at least one destination table based on the set of instructions, the at least one destination table having a format and fields, wherein the update processor loads the transformed data in an automatic sequence so that referential integrity is maintained.

41. The system as claimed in claim 40 wherein the data map architect loads the data from the at least one source into at least one temporary table having source and destination fields.

42. The system as claimed in claim 41 wherein the at least one temporary table is a relational database table.

43. The system as claimed in claim 41 wherein the at least one source is an ASCII file and wherein the data map architect also creates an extract table with the data from the at least one source and loads the extract table into the at least one temporary table.

44. The system as claimed in claim 41 wherein the at least one source is a relational database table and wherein the data map architect automatically loads the relational database table into the at least one temporary table.

45. The system as claimed in claim 41 wherein the data map architect also associates the source fields with the destination fields based on the schema.

46. The system as claimed in claim 45 wherein the data map architect loads the data from the at least one source into the at least one temporary table and verifies data dependencies without the user having to write computer code.

47. The system as claimed in claim 45 wherein the data map architect creates templates for transforming the data from the at least one source based on the schema to obtain the transformed data.

48. The system as claimed in claim 45 further comprising at least one intermediate table having a format and fields and wherein the update processor links the at least one temporary table and its fields with the at least one intermediate table and its fields wherein the format and the field of the at least one intermediate table are substantially identical to the format and fields of the at least one destination table and wherein the update processor populates the at least one intermediate table with the transformed data.

49. The system as claimed in claim 47 wherein the data map architect creates the templates interactively with the user.

50. The system as claimed in claim 47 wherein the templates include data migration patterns and logical operators to provide instructions for translating and transferring the data from the at least one source.

51. The system as claimed in claim 50 wherein the patterns include a transfer mapping pattern.

52. The system as claimed in claim 50 wherein the patterns include a monovariate translation pattern.

53. The system as claimed in claim 50 wherein the patterns include a multivariate concatenation translation pattern.

54. The system as claimed in claim 50 wherein the patterns include a multivariate reverse concatenation translation pattern.

55. The system as claimed in claim 50 wherein the pattern includes a multivariate transformation pattern.

56. The system as claimed in claim 47 wherein the update processor generates the set of instructions based on the templates and the schema.

57. The system as claimed in claim 41 wherein the update processor moves the data from the at least one source to the at least one temporary table.

58. The system as claimed in claim 57 wherein the update processor enforces uniqueness constraints without the user having to write computer code.

59. The system as claimed in claim 57 wherein the update processor enforces referential integrity without the user having to write computer code.

60. The system as claimed in claim 57 wherein the update process specifies order of operations for moving data into the at least one destination table without the user having to write computer code.

61. The system as claimed in claim 57 wherein the update processor checks that mandatory fields are populated without the user having to write computer code.

62. The system as claimed in claim 48 wherein the update processor moves the data from the at least one source first to the at least one temporary table where it is transformed and then to the at least one intermediate table for correction to obtain corrected data.

63. The system as claimed in claim 47 wherein the update processor groups the templates into batches.

64. The system as claimed in claim 40 wherein the data base is a relational data base and the at least one destination table is a relational database table.

65. The system as claimed in claim 40 wherein the migration engine migrates the data from a plurality of sources.

66. The system as claimed in claim 40 wherein the transformed data loaded into the at least one destination table by the update processor updates or adds to records already in the at least one destination table.

* * * * *

UNITED STATES PATENT AND TRADEMARK OFFICE
CERTIFICATE OF CORRECTION

PATENT NO. : 6,151,608
DATED : November 21, 2000
INVENTOR(S) : Helene G. Abrams

It is certified that error appears in the above-identified patent and that said Letters Patent is hereby corrected as shown below:

<u>Column 25,</u>
Line 36, after "tables" delete "substantially simultaneously".

Signed and Sealed this

Twenty-third Day of October, 2001

Attest:

Attesting Officer

NICHOLAS P. GODICI
*Acting Director of the United States Patent and Trademark Office*